May 9, 1967
R. H. ROBINSON
3,319,159
METHOD AND APPARATUS FOR DETERMINING THE
AMOUNTS OF GASES DISSOLVED IN LIQUIDS
Filed Nov. 16, 1962
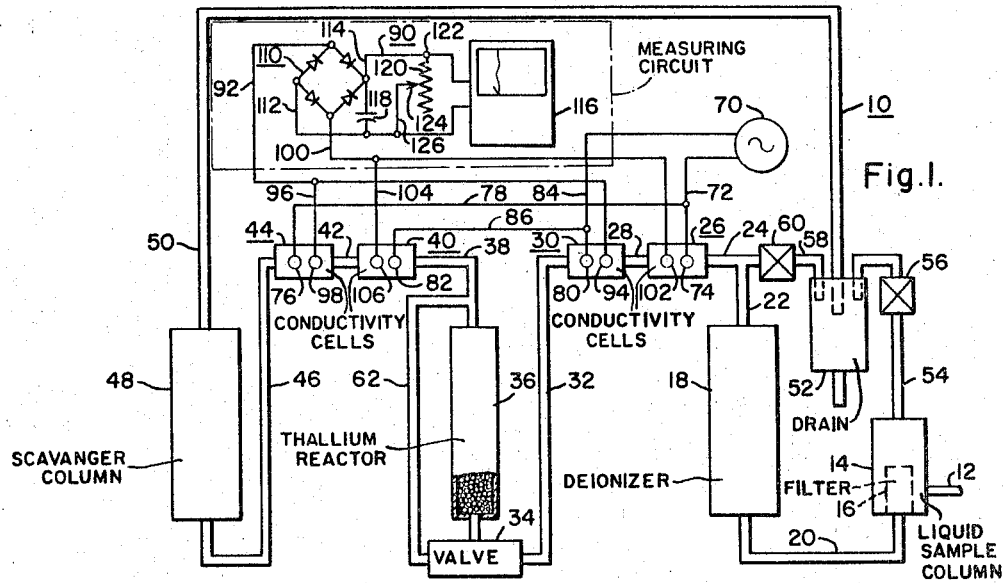
Fig.1.
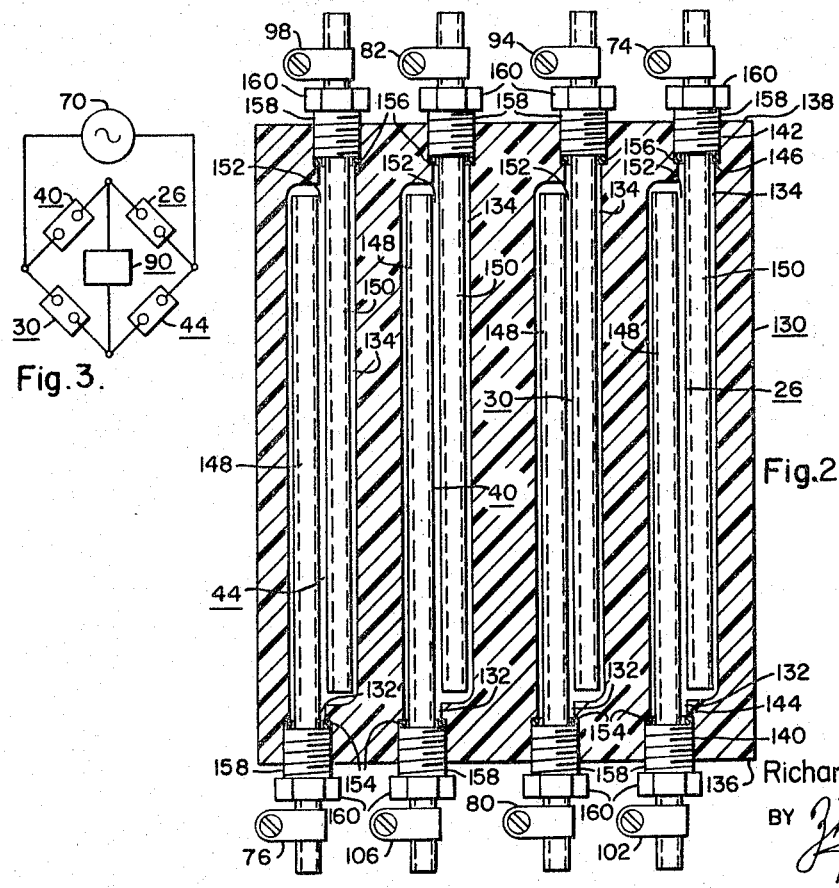
Fig.3.
Fig.2.
INVENTOR
Richard H. Robinson
BY 
ATTORNEY

United States Patent Office 3,319,159
Patented May 9, 1967

3,319,159
METHOD AND APPARATUS FOR DETERMINING THE AMOUNTS OF GASES DISSOLVED IN LIQUIDS
Richard H. Robinson, Kansas City, Mo., assignor to Westinghouse Electric Corporation, Pittsburgh, Pa., a corporation of Pennsylvania
Filed Nov. 16, 1962, Ser. No. 238,175
5 Claims. (Cl. 324—30)

The present invention is directed generally to electrical network measuring apparatus and more particularly to a novel electrical bridge network having more than one unbalanced branches therein for obtaining high accuracy outputs therefrom.

More particularly this invention further relates to a novel multiple conductivity cell arrangement in the bridge network of this invention and an application thereof in conjunction with the detection of quantities of gases in liquid systems.

For determining the amounts of a gas dissolved in a liquid medium, for example, the determination of the amount of oxygen gas dissolved in water, electrical bridge arrangements have been provided pursuant to the prior art wherein an electrical conductivity cell forms one leg of the bridge arrangement. In other forms of the prior art, a comparative means is utilized wherein the sample to be measured is subjected to a chemical reaction. One leg of the electrical bridge arrangement includes an electrical conductivity cell determining the conductivity of the fluid before the chemical reaction, while another leg of the electrical bridge includes a conductivity cell which measures the conductivity of the liquid after the same has undergone the chemical reaction.

In accordance with the prior art in the measurement of the amount of oxygen dissolved in water, a chemical reaction of the water with thallium metal is provided wherein the thallium reacts with the water to form thallous hydroxide pursuant to the following reactions:

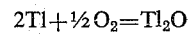

The overall reaction for the conversion of the dissolved oxygen into thallous hydroxide becomes:

The end reaction product, thallous hydroxide, is a strong electrolyte. The concentration of thallous hydroxide formed in the sample can be determined by measuring the conductance of the solution and this measurement serves to determine the amount of oxygen present in the water sample.

In certain applications of this invention, the amount of oxygen dissolved in water must be maintained below a certain level, for example, below 0.2 p.p.m. of oxygen. Thus, a dissolved oxygen detection device must be capable of determining the presence of minute quantities of oxygen dissolved in water for such applications.

Use of oxygen measuring apparatus in conjunction with electrical conductivity cells and electrical bridge arrangements of the prior art, has resulted in measurements of the oxygen level with prior art arrangements, as described above, at the low oxygen levels desired; however, the accuracy and reproducibility of such measurements leave much to be desired. For example, an electrical bridge arrangement of the prior art, when operated with 60 cycle power, produces substantial deviations in outputs when, for example, a 1000 cycle per second power supply is substituted. For the same liquid sample, a conductivity cell arrangement of the prior art can provide errors in outputs approaching 100% when the power supplies for the electrical bridges are changed. As a result, while output measurements are obtained, the accuracy of the measurement is questionable. In addition an extremely long electrical conductivity cell must be utilized with the prior art bridge arrangements to obtain the desired sensitivities.

Accordingly, it is an object of this invention to provide a novel electrical bridge arrangement having conductivity cells forming portions of the legs thereof.

A further object of this invention is to provide a novel and highly accurate electrical bridge arrangement wherein two opposed reference legs of the electrical bridge circuit have an electrical conductivity cell mounted in each leg and wherein two opposed measuring legs of the bridge arrangement have a conductivity cell mounted in each leg.

Still another object of this invention is to provide a plurality of conductivity cells of novel construction.

A further object of this invention is to provide a plurality of conductivity cells of novel construction mounted in a unitary support.

A further object of this invention is to provide a new and improved dissolved oxygen measuring apparatus utilizing the novel conductivity cell and electrical bridge arrangements heretofore described in connection with other objects of this invention.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which;

FIGURE 1 is a schematic view of a dissolved gas measuring system including the novel electrical bridge arrangement of this invention; and FIG. 2 is a sectional view of the novel conductivity cells forming a part of this invention with the conductivity cells being mounted on a unitary support.

FIG. 3 is a schematic diagram of the electrical circuit depicted in FIG. 1 illustrating the specific legs of the electrical bridge in which the reference and the measuring conductivity cells are located.

In accordance with this invention a liquid sample containing a dissolved gas is passed into a dissolved gas measuring system. The sample is first passed through a deionizer to remove substantially all ions initially in the liquid sample. The sample is then passed through a pair of reference conductivity cells with each of the reference conductivity cells being located in one of the reference legs of an electrical bridge. The sample then passes from the reference conductivity cells to a chemical reactor portion of the circuit, for example, in the case of dissolved oxygen a thallium reactor wherein thallium metal chips are disposed. The dissolved gas, such as oxygen reacts with the thallium metal in the reactor, to form thallous hydroxide which remains in the liquid sample in ionized form. The sample is passed from the chemical reactor to a pair of measuring conductivity cells located in opposed legs of the bridge circuit so that the measuring cells now measure the conductivity of the solution and the conductivity of the thallium and hydroxide ions. The two measuring conductivity cells are electrically connected in two opposed measuring legs of the electrical bridge circuit thereby providing an output from the electrical bridge circuit, the magnitude of which varies substantially linearly with the amount of oxygen dissolved in the liquid sample. The liquid sample passes from the measuring conductivity cells to a drain to remove the same from the circuit. If desired, a scavenger column can be provided to reclaim the thallium metal dissolved in solution through an appropriate reverse reaction.

It is to be noted that the electrical bridge arrangement comprises a network having four serially connected legs with two pair of conjugate terminals respectively disposed at the connections of the legs thereof. Electrical power is supplied to one pair of conjugate terminals and indicating means are connected across the other pair of conjugate terminals. Each of the legs of the bridge network contains an electrical conductivity cell arranged with the two reference cells disposed in opposed legs of the bridge circuit and with the two reference cells located in the other opposed legs of the circuit. In this manner, with a bridge arrangement of the character described, an unbalance exists in each of the branches of the bridge. This unbalance results in a greater sensitivity of the bridge output when compared with accuracy of a bridge circuit having only one branch unbalanced. To obtain equal sensitivity without the use of two unbalanced branches, it would otherwise be necessary to double the effective length of the conductivity cell in the unbalanced branch of the prior art arrangements. With the instant invention, a double unbalance in the bridge network is achieved using two relatively small conductivity cells in two unbalanced branches of the network rather than a very long cell in a single unbalanced branch of the prior art arrangement.

Referring now specifically to FIGS. 1 and 3 of the drawings, a flow circuit 10 is provided in this example for the measurement of the amount of oxygen dissolved in a liquid sample, such as water. Accordingly, the flow circuit is provided with inlet 12 which is desirably constructed to be connected to a suitable sample (not shown). The inlet 12 is connected to a column 14 which desirably has a filter 16 mounted therein and formed to remove extraneous material from the liquid sample. Of course, the filter 16 is desirably chosen to permit the retention by the liquid sample of all dissolved oxygen therein. The filter column 14 is connected to a deionizing column 18 by a conduit 20 with a deionizing column 18 having a suitable ion exchange resin therein such as for removing substantially all ionized material initially present in the liquid sample. The liquid sample passes from the deionizing column 18 through the conduit 22 to the branch conduit 24 into the first reference conductivity cell 26. The sample then passes from the reference conductivity cell 26 to conduit 28 to a second reference conductivity cell 30 with the conductivity cells 26 and 30 forming the reference resistance measurements in the two opposed reference legs of the electrical bridge circuit, as shown more clearly in FIG. 3. The liquid sample passes from the conductivity cell 30 through a conduit 32 to a valve 34 into a reactive column 36. The reactive column 36 desirably contains chips of thallium metal which are disposed to contact substantially all of the liquid sample to convert substantially all of the oxygen dissolved therein into $OH^-$ ions and $Tl^+$ ions.

The sample passes from the reactor column through a conduit 38 into the first measuring conductivity cell 40 and therefrom through a conduit 42 into the second measuring conductivity cell 44. As shown in FIG. 3, the measuring conductivity cells 40 and 44 are connected in opposite legs of the electrical bridge arrangement to form the resistance elements thereof. A conduit 46 is connected to the outlet of the conductivity cell 44 and passes a liquid sample from the cell 44 through a scavenger column 48 which desirably contains a suitable material for removing the thallium from the liquid sample. From the scavenger column 48, the sample passes through a drain conduit 50 into a drain pot 52.

Suitable pumping means (not shown) can be provided in the flow circuit 10 for transporting the liquid therethrough. Alternately, a continuous measurement may be obtained by passing a continuous flow under pressure from the inlet 12 through the flow circuit 10. It has been determined that a flow rate through the flow circuit 10 of 150 cc./min. can be utilized in the dissolved oxygen analysis system with extremely accurate results. The flow circuit 10 may also contain a conduit 54 connecting the filter column 14 directly to the drain pot 52 and having a normally closed bypass valve illustrated schematically and designated by the reference character 56 disposed therein. The bypass valve 56 may be opened for the purpose of diverting any inlet flow directly into the drain pot 52. In addition, the conduit 22 is also connected to a branch line 58 containing a normally closed valve 60 therein for diverting the inlet flow from the deionizing column 18 into the drain pot 52. Similarly, for the purpose of initial calibration or testing of the conductivity cells in the electrical bridge circuit, the two way valve 34 may be operated to connect the conduit 32 to a bypass conduit 62 which bypasses the thallium reactor column 36 and connects the conduit 32 directly to the conduit 38.

Referring now to the electrical portions of the flow circuit, it is to be noted that each of hte conductivity cells 26, 30, 40 and 44 includes a pair of electrical terminals with the terminals being connected respectively to the space tubes or electrical plates of the conductivity cells. Each of the terminals enables the conductivity cell to be electrically connected in a measuring circuit.

In accordance with the invention, the electrical bridge circuit is coupled to a source of power 70. For the specific application of this invention described herein, the power source 70 is desirably an alternating current source. In this regard, since the resistive elements of the electrical bridge comprise conductivity cells, 26, 30, 40 and 44, a direct current source would result in polarization of the cells. Accordingly, an alternating current source desirably is utilized for the purpose of preventing such polarization. For purposes hereof, however, the alternating source 70 is treated as a direct current source having the peak magnitude or absolute value of the alternating current source. The source 70 is connected by conductors across the bridge circuit; in particular, across one pair of the conjugate terminals of the bridge network such that one side of the source 70 is connected by a conductor 72 to the terminal 74 of the conductivity cell 26 and also to the terminal 76 of conductivity cell 44 by conductor 78. To complete the connection of the power source 70 across the electrical bridge circuit, the other end of the power supply 70 is connected to both the terminal 80 of reference conductivity cell 30 and to the terminal 82 of measuring conductivity cell 40, respectively, by conductors 84 and 86. A measuring circuit, referred to generally by the reference character 90 is connected between the other pair of conjugate terminals in the electrical bridge circuit. More particularly, one end of the measuring device 90 is connected by lead 92 to the terminal 94 of the reference conductivity cell 30 and also by lead 96 to the terminal 98 of the measuring conductivity cell 44. Similarly, the other end of the measuring circuit 90 is connected by conductor 100 to the terminal 102 of the reference conductivity cell 26 and by conductor 104 to the terminal 106 of measuring conductivity cell 40.

The electrical bridge arrangement is provided with the measuring conductivity cells 40 and 44 being disposed in one pair of the opposed legs of the bridge and the reference conductivity cells 26 and 30 being disposed in the other pair of opposed legs of the bridge circuit. As shown in FIG. 3, the bridge circuit is represented as a diamond connection with each of the four sides of the diamond being one of the legs of the electrical bridge. The power supply 70 is connected across the diamond such that one side of the source 70 is connected between the conductivity cells 26 and 44 while the other side of the source 70 is connected between the conductivity cells 30 and 40. The output measuring device or indicator 90 is also connected across the bridge diamond with one side of the indicating means 90 being connected between the measuring conductivity cell 44 and the reference conductivity cell 30. The other side of the indicating means 90 is connected between the measuring conductivity cell 40 and the reference conductivity cell 26.

As shown in FIG. 1, the measuring circuit 90 includes a full wave rectifier circuit 110 having the conductors 92 and 100 connected thereacross and having output conductors 112 and 114. The output conductor 112 is connected to one terminal of a suitable recording means 116, such as a line recorder, of conventional design. The other output conductor 114 is connected to the other terminal of the recording means 116. In addition, the measuring apparatus 90 includes a condenser 118 connected across the output conductors 112 and 114 and a variable resistance 120. One end of the variable resistance is connected to the output conductor 114 at 122. The variable resistance 120 may comprise a slide wire rheostat having a movable terminal 124 connected to the other output lead 112 by a conductor 126.

The alternating current output from the electrical bridge flows to the indicating means 90 by conductors 92 and 100. This output is rectified by the full wave rectifier 110 which is connected between the output conductors 92 and 100. The output of the full wave rectifier is passed through a resistance-capacitance arrangement connected across the output leads and to the recording means 116. In this manner the alternating current signal is changed to a direct current signal and provides a direct current output to the indicator 116. In furtherance of this purpose, the capacitor 118 serves to filter the output from the rectifier 110 thereby removing the pulse effect from the full wave rectifier 110. The resistor 120 serves, in part, as a load resistance for the output and, in part, as a calibration means for setting the sweep of the recording means 116.

Experimentation with the dissolved oxygen measuring system has proven the importance and accuracy of this invention. More particularly it has been found that the electrical bridge circuit produces a two micro ampere response for every part per billion of dissolved oxygen in a flow of deionized and degassed water. In addition, the output of the cell has been determined to be linear for oxygen concentrations varying up to at least 7,000 parts per billion. The aforesaid results were obtained utilizing a 60 cycle alternating current power source with the bridge having 6 volts thereacross.

The experimental investigation of this invention also included the possibility of the attaining of a false reading due to the electrolysis of water in the conductivity cell construction of this invention and the subsequent reaction of the water in the reference cells to produce oxygen. It was determined that an increase in the bridge voltage from 3 volts and increments up to 60 volts did not result in a variation in the oxygen concentration of a given sample containing 25 parts per billion of dissolved oxygen.

In performing the above task, it was determined that with 60 volts across the electrical bridge, the cell output measured approximately 728 micro-ammeters. It may therefore be concluded that for high resistivity fluids, dissolved oxygen concentrations in the area of $10^{-12}$ may well be measured by the apparatus of this invention.

As pointed out previously, the use of the electrical bridge having a double unbalance, that is, having a reference cell in two of the opposed legs of the bridge and a measuring cell in the remaining opposed cells of the bridge increases substantially the sensitivity of the measuring apparatus and permits the use of substantially smaller conductivity cells to obtain such sensitivities.

It is to be pointed out that the construction of electrical conductivity cells utilized in conjunction with this invention wherein electrolysis of the liquid medium does not take place even with a voltage of 60 volts across the electrical bridge plays an important role in the instant invention. Referring now to FIG. 2 of the drawings, it is to be noted that the flow circuit of this invention requires four separate conductivity cells to be utilized in the electrical bridge arrangement. In accordance with the invention, a unitary mounting for the plural electrical conductivity cells of this invention is provided wherein a solid member or support 130 is formed from a suitable insulating material, such as polymethyl methacrylate. Each of the conductivity cells 26, 30, 40 and 44 is formed in the support 130. Each conductivity cell is formed by suitable means such as by the drilling of two slightly off-set openings such as 132 and 134 respectively in opposed sides 136 and 138 of the support 130. Each opening 132 and 134 extends inwardly from one side of the support 130 towards the opposite side thereof and terminates closely adjacent the opposite side. The openings 132 and 134 are off-set in such a manner as to result in the removal of any partition thereby forming a central chamber between the adjacent pair of openings. Each of the openings 132 and 134 is provided with an enlarged portion 140 and 142 respectively adjacent the respective sides 136 and 138. The enlarged portions 140 and 142 provide shoulders 144 and 146 which face the opposed sides 136 and 138 respectively of the support 130. Each electrical conductivity cell includes a pair of spaced tubular members 148 and 150 disposed respectively in the adjacent pair of openings 132 and 134 and which are conveniently formed from a suitable tubing such as stainless steel tubing. The tubular members 148 and 150 forming one conductivity cell desirably are maintained in spaced relation with each other to provide a reactive zone 152 therebetween having a potential difference thereacross. Leakage from the interior of the support 130 is prevented by the use of suitable sealing means such as O-rings 154 and 156 disposed respectively on the shoulders 144 and 146. The enlarged openings 140 and 142 are desirably provided with interior machine threads which receive a threaded annular coupling 158. The coupling 158 is desirably provided with a suitable flange 160 thereon having a cross section which permits the threaded insertion of the coupling 158 into the enlarged openings 140 and 142 by suitable means such as a wrench. The coupling 158 desirably is formed of such a length as to extend closely adjacent the shoulders 144 and 146 and to engage and compress the sealing means 154 and 156. Each of the couplings 158 desirably is secured to the tubular members 148 and 150 respectively in a leak-tight manner such as by brazing, to prevent any leakage from the interior of the support 130 through the clearances between the outer surface of the tubular members 148 and 150 and the interior of the respective annular couplings 158. Each of the tubular members 148 and 150 desirably extends outwardly beyond the outward end of its respective coupling 158 so that a suitable fluid conduit may be secured thereto. Malleable, generally U-shaped terminal straps such as the terminals 74, 94, 82, 98, 76, 106, 80 and 102 desirably are mounted respectively on the extensions of each of the tubular members 148 and 150 in such a manner as to provide a good electrical connection therebetween. Thus, the electrical conductivity cells of this invention include spaced electrodes 148 and 150 which also serve as flow conduits for the liquid passing through the cell. More specifically, fluid enters the electrical conductivity cell 26 through the extension of the tubular member 150 and flows through the tubular member 150 into the space 152 of the central chamber of the cell and then passes into the tubular member 148 to exit from the conductivity cell. Potential is supplied across the space 152 of each cell by merely placing the desired potential difference across each of the terminals such as the terminals 74 and 102 of the cell 26. Since each of the tubular members 148 and 150 is made from an electrical conductor, the desired potential difference is placed across the entire space 152.

There has been described in detail herein an illustrative embodiment of this invention. Many modifications and departures from the specific apparatus described in detail herein can be made without departing from the broad spirit and scope of this invention. Accordingly, it is specifically intended that the detailed description of this invention be interpreted in an illustrative rather than in a limiting sense.

I claim as my invention:

1. In an apparatus for measuring the amount of oxygen dissolved in a liquid sample, a measuring network having first, second, third and fourth legs connected in series, a pair of conjugate terminals between said first and second legs and between said third and fourth legs, respectively, another pair of conjugate terminals between said second and third legs and between said fourth and first legs, respectively, an electrical conductivity cell electrically connected in each of said first, second, third, and fourth legs of said network, means supplying alternating current power to one of said terminal pairs, indicating means connected to the other of said terminal pairs, a liquid sample, conduit means for passing said liquid sample through the ones of said conductivity cells connected in said first and said third legs of said network, respectively, means for ionizing the oxygen dissolved in said liquid sample including a column of thallium metal, means for transporting said sample from the last mentioned conductivity cells to said ionizing means and from said ionizing means to the ones of said conductivity cells connected in the remaining legs of said network.

2. In an apparatus for measuring the amount of a gas dissolved in a liquid sample, a measuring network having first, second, third and fourth legs connected in series, a pair of conjugate terminals between said first and second legs and between said third and fourth legs, respectively, another pair of conjugate terminals between said second and third legs and between said fourth and first legs, respectively, an electrical conductivity cell electrically connected in each of said first, second, third and fourth legs of said network, means supplying alternating current power to one of said terminal pairs, indicating means connecting to the other of said terminals pairs, a liquid sample, conduit means for passing said liquid sample through the ones of said conductivity cells connected in said first and said third legs of said network, respectively, means for ionizing the gas dissolved in said liquid sample, means for transporting said sample from the last mentioned conductivity cells to said ionizing means and from said ionizing means to the ones of said conductivity cells connected in the remaining legs of said network, each of said conductivity cells being formed in a unitary support of insulating material, said support having at least four pairs of openings formed therein with the openings of each of said pairs of openings extending inwardly from opposed sides of said support respectively, each of said openings extending from one of said opposed sides to a position closely adjacent the other of said sides of said support, one of said openings of each of said pairs of openings being offset from the other of said openings of each of said pairs of openings, respectively, each of said pairs of openings being formed with a common chamber therein, a pair of tubular electrically conducting members disposed in each of said pairs of openings, each of said tubular member pairs being disposed in spaced relationship, the tubular members of each pair being spaced from one another and having a coextensive portion, means sealingly mounting said tubular members in said openings whereby each of said pairs of tubular members forms a portion of an individual electrical conductivity cell.

3. A multiple electrical conductivity cell comprising a unitary support of insulating material having opposed sides, said support forming a plurality of separated, interior hollow chambers therein, said support having a pair of offset passageways extending from each of said interior chambers to said opposed sides of said support, respectively, a pair of electrically conducting tubular members extending through said pairs of passageways into each of said chambers respectively, the tubular members of each of said pairs being mounted in spaced relationship and having portions thereof coextensively disposed, terminal means secured to each of said tubular members, and means for sealing the space between said tubular members and said passageways, respectively, whereby each of said chambers forms an electrical conductivity cell with fluid entering and exiting therefrom through those of said tubular members disposed therein.

4. The method of determining the amount of a gas dissolved in a liquid sample with apparatus including an electrical bridge circuit having an electrical conductivity cell connected in first, second, third and fourth legs therein, said legs being connected in series and having two pairs of conjugate terminals between the legs of said circuit, said bridge having a source of power connected to one of said terminal pairs and indicating means connected to the other of said terminal pairs, the said method comprising the steps of continuously passing said liquid sample through a deionizing medium to remove ions therefrom, then continuously passing said liquid sample through the conductivity cells disposed in both the first and third legs of said circuit, then passing the liquid sample through an ionizing means to ionize the dissolved gas to be measured, and then passing said sample through the remainder of said conductivity cells while a portion of said samples passes through said cells in said first and third legs, and measuring the unbalance of said bridge.

5. In an electrical conductivity measuring apparatus, a unitary support of insulating material having a pair of opposed sides, said support forming a plurality of separated interior chambers therein, said support having a plurality of first passageways formed therein extending from one of said sides to said chambers, respectively, said support having a plurality of second passageways formed therein extending from the other of said sides to said chambers, respectively, said first passageways to said chambers being offset from said second passageways to said chambers, respectively, an electrically conducting open ended tubular member disposed in each of said first and said second passageways, each of said tubular members disposed in said first passageways having a portion thereof diposed in said chambers coextensively with those tubular members disposed in said second passageways, respectively, whereby fluid enters said chambers through the tubular member disposed in said first passageways thereof and exits therefrom through the tubular members disposed in said second passageways thereof, respectively.

References Cited by the Examiner

UNITED STATES PATENTS

| | | | |
|---|---|---|---|
| 1,701,181 | 2/1929 | Gruss | 73—27 |
| 2,589,758 | 3/1952 | Wojciechowski | 324—57 |
| 2,821,680 | 1/1958 | Slusser et al. | 324—64 X |
| 2,888,330 | 5/1959 | Kapff | 73—27 |
| 2,980,852 | 4/1961 | Mell | 324—57 |
| 3,020,746 | 2/1962 | Minter | 73—27 |
| 3,032,402 | 5/1962 | Schlenz | 73—27 X |
| 3,265,963 | 8/1966 | Chenovard et al. | 324—30 |

WALTER L. CARLSON, *Primary Examiner.*

FREDERICK M. STRADER, *Examiner.*

C. F. ROBERTS, *Assistant Examiner.*